(12) United States Patent
Loen et al.

(10) Patent No.: US 7,678,213 B1
(45) Date of Patent: Mar. 16, 2010

(54) OPERATING METHODS FOR A BATCH COMMERCIAL METAL COIL LAMINATING LINE

(75) Inventors: Mark V. Loen, Maricopa, AZ (US); James E. Velliky, Jacksonville, FL (US)

(73) Assignee: Design Analysis Inc.

( * ) Notice: Subject to any disclaimer, the term of this patent is extended or adjusted under 35 U.S.C. 154(b) by 662 days.

(21) Appl. No.: 11/530,723

(22) Filed: Sep. 11, 2006

Related U.S. Application Data

(60) Provisional application No. 60/716,053, filed on Sep. 13, 2005.

(51) Int. Cl.
*B32B 37/00* (2006.01)

(52) U.S. Cl. .......................... 156/64; 156/82; 156/259; 156/267; 156/282; 156/324

(58) Field of Classification Search .................. 156/82, 156/282, 308.2, 309.9, 322, 324, 555, 582, 156/583.1, 64, 250, 259, 267
See application file for complete search history.

(56) References Cited

U.S. PATENT DOCUMENTS

| | | | | |
|---|---|---|---|---|
| 4,980,210 A | * | 12/1990 | Heyes | 428/35.9 |
| 5,058,475 A | * | 10/1991 | Tidland et al. | 83/481 |
| 5,059,460 A | * | 10/1991 | Heyes et al. | 428/35.3 |
| 5,125,301 A | * | 6/1992 | Miller et al. | 83/13 |
| 5,238,517 A | * | 8/1993 | Heyes | 156/243 |
| 5,318,648 A | * | 6/1994 | Heyes et al. | 156/244.24 |
| 5,679,200 A | * | 10/1997 | Newcomb et al. | 156/308.2 |
| 5,919,517 A | * | 7/1999 | Levendusky et al. | 427/211 |
| 6,200,409 B1 | * | 3/2001 | Tanaka et al. | 156/309.9 |
| 6,217,991 B1 | * | 4/2001 | Tanaka et al. | 428/212 |
| 6,723,625 B2 | * | 4/2004 | Mine et al. | 438/592 |
| 6,758,903 B2 | * | 7/2004 | Levendusky et al. | 118/67 |
| 2004/0213916 A1 | * | 10/2004 | Carey et al. | 427/433 |

* cited by examiner

*Primary Examiner*—James Sells

(57) ABSTRACT

Important features and improvements of a commercial coil batch laminating production line are disclosed for a successful, commercial, and economical operation. This invention addresses important processing sequences, operating parameters, control systems, designs, operating methods, and other novel features. This invention provides for a competitive cost structure meeting the needs of commercialization.

16 Claims, 6 Drawing Sheets

OPERATING METHODS FOR A BATCH COMMERCIAL METAL COIL LAMINATING LINE

CROSS-REFERENCE TO RELATED APPLICATIONS

This application claims the benefit of U.S. provisional application No. 60/716,053 filed on Sep. 13, 2005. The entire provisional application is incorporated herein by reference. The later filed application supersedes the provisional application for any claims or teaching that conflict between applications.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING COMPACT DISC APPENDIX

Not applicable.

BACKGROUND OF THE INVENTION

1. Field of the Invention

The disclosed invention relates to improvements, methods, and equipment that is adapted to successfully laminate a metal strip, in particular, steel or aluminum strip, with a thermoplastic film based on a polymer such as polyethylene, polyester, polycarbonate, vinyl, kynar, acrylic, or polypropylene in an economical commercial operation. The invention relates to particular technical aspects of operating an economically viable commercial batch coating line for laminating coils of flat metal substrates.

2. Discussion of the Related Art

Existing commercial coil paint coating lines are generally continuous in nature and consist of long processing lines with multiple processing steps. A considerable amount of equipment is dedicated to the required material handling for a continuous process. In addition to reels, there is an entry and exit looping tower so the line can continue the coating operation while the new coil is spliced to the end of the previous coil. There are no commercially practical splicing methods for a moving strip, so strip storage towers are required to allow the entry end of the line to stop while the coil ends are joined. Looping towers include tension controlling equipment, guiding equipment, and bridle roll equipment. This makes a continuous processing line very long, complicated, and expensive.

Existing commercial paint lines require higher line speeds for favorable economic operation. Since a large work crew is required to operate a complicated, high production line, economic considerations require that the line speed be as high as possible. Paint lines operate as fast as practical, very commonly at speeds 200 to 450 fpm. The speed is normally restricted by the length of drying oven and the time to cure the paint.

Because commercial coil paint lines have the most favorable economy of scale with a large production order, it is unattractive to economically coat small orders. Paint lines commonly charge a premium for painting a one or two coil order due to the higher costs associated with switchover and cleanup time.

It is a difficult technical and operational challenge to coat small orders with economics that allows for practical competition with the large coil paint lines.

Existing laminating lines have been put into service utilizing similar production and economic planning as commercial paint lines. A number of coil paint lines include a laminating unit after the second drying oven. The lamination step utilizes an adhesive that is painted on the strip surface and dried in an oven. The film is then pressed onto the adhesive in a continuous operation. The strip has a laminated film on one side and the other side is painted or left uncoated. Similar issues of economics of scale become part of the commercial operation of a laminating operation. A number of operators are required to run the line, staff the warehouse, staff the front office, etc. which require a high operating speed for economic efficiency. Laminating speeds less than 100 fpm become economically unattractive.

Due to current economics, laminating has not presently replaced paint coatings for most products that are pre-painted in the coil form. In general the films are designed to be utilized with pressure adhesives and are often have special printing to provide important aesthetics or cosmetic appearance. Economic film coatings have not been a serious pursuit and are considered expensive compared to paint.

Thermal lamination of a thermoplastic film on a metal substrate is an attractive alternative to current production methods just described. For example, U.S. Pat. Nos. 5,318, 648, 5,238,517, 5,093,208, 5,059,460, 4,980,210, and 4,957, 820 by Heyes et al, and U.S. Pat. Nos. 6,217,991 and 6,200, 409 by Tanaka et al., and U.S. Pat. Nos. 6,758,903 and 5,919, 517 by Levendusky et al. describe certain technical features of a pilot thermal laminating process and experimental film materials. In these examples, various laminating process steps, parameters, and film types are disclosed which are applied to a metal substrate. However, operating parameters and requirements of a commercial production line, which consider important business variables such as capital needs, labor, utilities, etc. are not described in these patents. For example, even though the figures in Levendusky et al. show a reel to reel laminating process, many important features and methods required for a convenient, commercially operable, and financially profitable production facility are not taught or disclosed.

In particular, a number of important design, technical, and operational problems must be solved for the commercial viability of a heat based, batch laminating production line. The potential use of thermoplastic films is economically appealing and provides important environmental and energy benefits. A coating industry has not grown up to exploit the economic advantages of thermoplastic films due to the technical, business, operational, and market issues still to be resolved.

One important operating issue for a thermal based laminating line is an economical design for a small production level, about 5-15% of a commercial continuous coil paint line. The problems of scaling a coating operation down to a small production level with only the essential processing steps are raised. From a business standpoint, it is desirable to begin production of a new coating method with a low capital entry point and, simultaneously, low operating costs. It is very important to reduce capital expenditures by avoiding the need for process line material handling equipment, such as the looping towers previously described. Thus, it is desirable to operate in a batch mode, i.e. one coil at a time.

The term "batch operation" can be confusing in regard to a coil coating line. When a coil is threaded on a batch production line, there is a long period of time where the line is operated in a continuous and steady state manner. For the purposes of this invention, the term "batch operation" means that coils are coated in sequence and the coating portion of the line is started and stopped for each coil. A batch operation may include more than one pay off reel, or may include more than one winding reel.

One important operational consideration is how the film width is matched to the substrate width. Existing pressure based laminating operations use films widths which match the metal substrate width. During the laminating step, the position of the film or the position of the strip is guided so that the laminated film is applied correctly. There has not been any practical method disclosed where standard film widths may be utilized for economical film purchases.

It is a distinct commercial advantage to provide for utilizing a thermal laminating film with standard sizes rather than custom order each individual film roll to match the metal substrate. Film pricing is better with improved production scheduling and lot sizing at the film supplier. Also, production is better if freed from the time delays required to order in a particular film width. This requires that an acceptable method of dynamically matching the film width to the metal substrate is performed on the laminating production line.

It is well known in the art to trim a composite laminate film structure after laminating by using fixed position trimming knives. Various stationary and rotating knives are used which are locked at a fixed width. Both the film and the substrate, such as paper, are then trimmed together to the final width. The equipment needed to dynamically trim the edges of a wider film from a thick metal substrate has not been taught or disclosed. For example, U.S. Pat. No. 6,732,625 by Boynton, et al., U.S. Pat. No. 5,058,475 by Tidland, et al., and U.S. Pat. No. 5,125,301 by Miller, et al. describe methods of moving rotating knives to a new width position only while the knife is not cutting.

It is economically preferable to side trim excess film width rather than the entire film-metal structure due to the relative cost, and also due to the complexity of the needed equipment. The equipment and methods of trimming a film are easier to implement than side trimming a metal substrate. It is not desirable to trim both the metal and film to the correct width after laminating, nor is it desirable to let the excess film width simply overhang the metal edge. The overhanging film has a tendency to fold over on top of the metal, causing a severe coil winding defect.

Another important consideration is film shrinkage during heat laminating. When the cold film is applied to a heated metal substrate, it expands due to the temperature change. When the laminate is rapidly cooled, the film width changes more than the width of the metal substrate which exposes the edges of the metal. Film shrinkage can also occur due to crystallinity changes when an oriented film is heated and cooled. It is not attractive to order a film width for the metal substrate and account for multiple factors that affect the final film width after laminating.

Problems of trimming the excess polymer width away from the metal substrate include issues of reliably tracking the metal edge, damage to the cutting knives by the metal substrate for minor control errors, difficulties with metal edge sensing under a wider film, and the ability to move knives dynamically without damaging the blade or the blade bearing need to be addressed.

Another commercial operating difficulty is matching the length of a film roll to the strip length. Difficulties with length matching cause film yield problems and increase operating costs. It is not economically desirable to discard or recycle partial film rolls. It is also undesirable to stop the laminating process and change film rolls. An operational method must be created to address this issue for good coating economy.

When operating a batch thermal laminating line, it is difficult to completely cover the entire length of a coiled strip. The line must be threaded for each coil, strip tension established, the passline correctly established throughout the line, the film must be inserted into the laminating nip, any film wrinkles eliminated, the correct laminating pressure applied, the line brought up to operational speed, and the correct laminating temperature established. These processing steps, their sequence, and timing must be carefully coordinated and controlled to ensure optimum coating efficiency and yield. Important technical design features and operating methods must be included in the line operation to ensure the greatest operational efficiency.

An important aspect of operating a batch thermal laminating line is to provide for rapid control of the correct metal substrate laminating temperature, especially when establishing the initial film lamination to the metal substrate. Laboratory measurements show that a hot metal strip, at approximately 450° F., cools very rapidly in air. The cooling rate may be 10 to 50° F. per second, depending upon conditions. If the strip preheating is too far from the polymer-metal nip point at a slow line speed, the metal temperature will be too low or unpredictable for reliable laminating. Poor temperature uniformity will directly affect laminating quality and yield. A compensating control method must be utilized.

The use of heated rolls to create the preheated metal temperature may be problematical, particularly if the temperature of the metal strip must be varied. For example, it may be desirable to provide for an initial, higher temperature for lamination until the rolls which press the film onto the strip heat up. A heated roll has a large mass that must be heated and consequently has a poor temperature control response. If the strip temperature must be adjusted, the line speed changes, or the metal substrate temperature changes due to pretreatment changes, it is not feasible to rapidly change the roll temperature. It is important to provide instantaneously adjustable heating and coordinate it with a rapid response, accurate control system.

It is also important that the metal preheating does not affect the surface energy of the metal surface. In laboratory experience, surface pretreatment by a controlled flame provides important adhesive and wet properties to the metal surface. If a heating roll touches the metal surface after surface energy pretreatment, there is a likelihood of adhesion failure. In laboratory experience, sporadic and sparse adhesion defects were diagnosed to be caused by this problem.

Consequently, the design of the production line must consider ways to optimize and maintain the strip as clean as possible when entering the laminating nip. In particular, once the metal strip is pretreated, the metal surface is likely to pick up contamination from any debris on any roll it may touch. The debris may be light oils, dirt, dust, water, finger prints, cleaning residue, various chemicals, etc. Laboratory experience has shown that the pretreated metal surface will eventually remove common debris from processing rolls. However, the laminating quality will be substandard with places of air entrapment and poor adhesion until the debris is gone. The design of the line must consider methods that achieve an immediate, high quality lamination as rapidly as possible.

It is also difficult to accurately monitor the metal temperature just prior to lamination as non-contact sensors in the temperature range below 500° F. are known to be inaccurate and unreliable for metal surfaces such as steel and aluminum. A control method for providing an accurate, reliable laminating temperature feedback must be included in the line design to provide for a high quality laminating process with a high yield.

It is important that the metal substrate surface is properly cleaned sufficiently to achieve complete contact between the film and coil without air entrapment. U.S. Pat. No. 6,200,409 by Tanaka, et al, and U.S. Pat. No. 5,679,200 by Newcomb et al. describe problems with air entrapment between the laminating film and the metal substrate. Laboratory experience indicates that this problem is also clearly related to the surface energy of the metal substrate. The needed metal surface energy for proper film wetting on a thick metal substrate has not been disclosed. The practical ability of the laminating facility to achieve the proper surface energy with pretreatment becomes an important surface specification between the metal supplier and the laminating facility.

It is important to arrange the needed processing steps with a minimum line length. The line is normally threaded by hand and it is highly troublesome to attempt lamination during the threading operation. It is necessary to run pretreatment or heating systems only when there is assurance that the strip will not stop for safety and operational reasons. Consequently, pretreating, preheating, and film laminating is not started until the strip is completely threaded from reel to reel and strip tension is established. This will cause strip lengths at both ends of the coil to be uncoated with an associated yield loss. The yield loss is minimized by designing the line in a compact manner, including only the space and processing steps necessary for lamination. Methods of minimizing metal substrate yield loss become an important operational problem.

It is important to have a way to rapidly cool the film-metal laminate after the reheat step. Three practical methods to control temperature are by forced air, water quench, or contact with a thermally controlled roll. Each type of control has practical operational problems that must be optimized.

The forced air cooling is a relatively slow process, requiring a long section of line. The length of the line increases, thereby causing a higher yield loss. Also, the slower method may cause undesirable crystallinity effects in the film-metal laminate.

The water quench contacts the polymer surface with a fluid that is difficult to completely remove. However, the water system is attractive in that it provides rapid cooling in a short span.

Contacting thermal rolls may have undesirable polymer sticking if the polymer is too hot or the roll surface is damaged.

Also, laboratory observations are that cooling a film-metal laminate utilizing a contact cooling roll can be problematical. A clicking sound can be heard from the cooling roll due to uneven thermal control. The laminate surface simultaneously has uneven crystallization effects.

It is important to prevent damage to the roll surfaces of the processing line during the threading operation. Laboratory experience has shown that bits of rubber and metal from the scratching of rubber covered rolls and steel rolls will affect laminate quality. Operational procedures to ensure a satisfactory operation, free of roll surface damage, need to be incorporated into the production line.

An alternative to the existing coil paint technology is currently being sought due to the environmental problems with paint solvents. Roughly half of the paint volume used in coil paint lines are solvents that must be evaporated and burned off. Coil paint line drying ovens are required to operate with a negative pressure to ensure that solvents do not escape into the atmosphere. Laminating technology, in connection with thermoplastic films, create no airborne environmental issues. Further, laminating technology holds the promise of lower coating and operating costs.

BRIEF SUMMARY OF THE INVENTION

It is therefore the object of this invention to provide important operational methods and line features that are useful for a successful, commercial, and economical operation of a batch coil laminating coating line. The methods disclosed are important to provide a very low and competitive operational cost structure that meets commercial and competitive requirements to optimize labor, capital, yield, operating costs, and laminate quality.

DETAILED DESCRIPTION OF THE INVENTION

In order to avoid large capital expenditures for a small production line, it is desirable to eliminate any non-vital coating equipment. In particular, material handling equipment such as looping towers, splicing equipment, bridle rolls, steering units, and unnecessary deflector rolls are eliminated. Also, any water based cleaning and pretreatment should be reduced to the minimal threaded length to ensure high yields. Chemical passivation and pretreatment provide important corrosion properties of the metal polymer laminate. For some products, however, passivation is not necessary and equipment required to create it on a metal surface can be eliminated from the laminating line. For some products, cleaning and passivation is a requirement.

A commercial batch laminating process for a flat metal substrate will have the following general processing steps:
1. Pretreating the surface of the metal substrate that will be laminated by raising the surface energy.
2. Preheating the metal substrate to a suitable laminating temperature.
3. Pressing a solidified film that is primarily a thermoplastic polymer onto one or both sides of the metal surface.
4. Reheating the film-metal laminate structure to a post treatment temperature.
5. Cooling the film-metal laminate.

Figure 1:
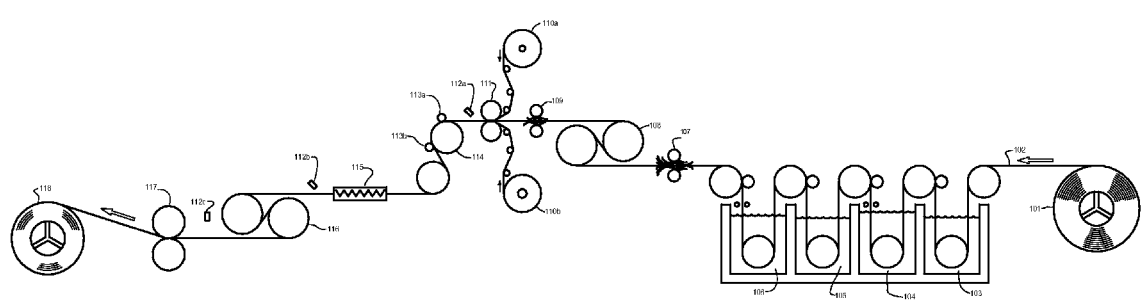
FIG. 1 is a preferred general line layout arrangement of a batch production metal strip laminating line.
Figure 4:
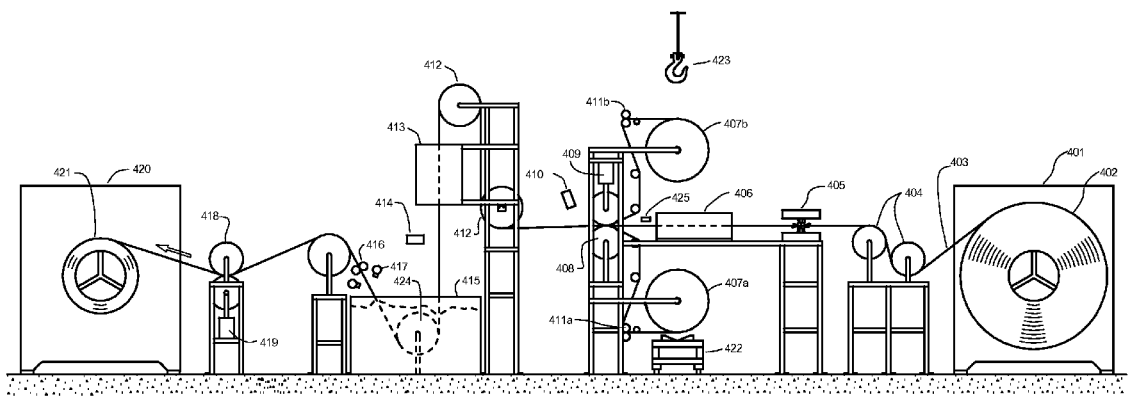
FIG. 4 is another preferred general line layout arrangement of a batch production metal strip laminating line.
Figure 6:
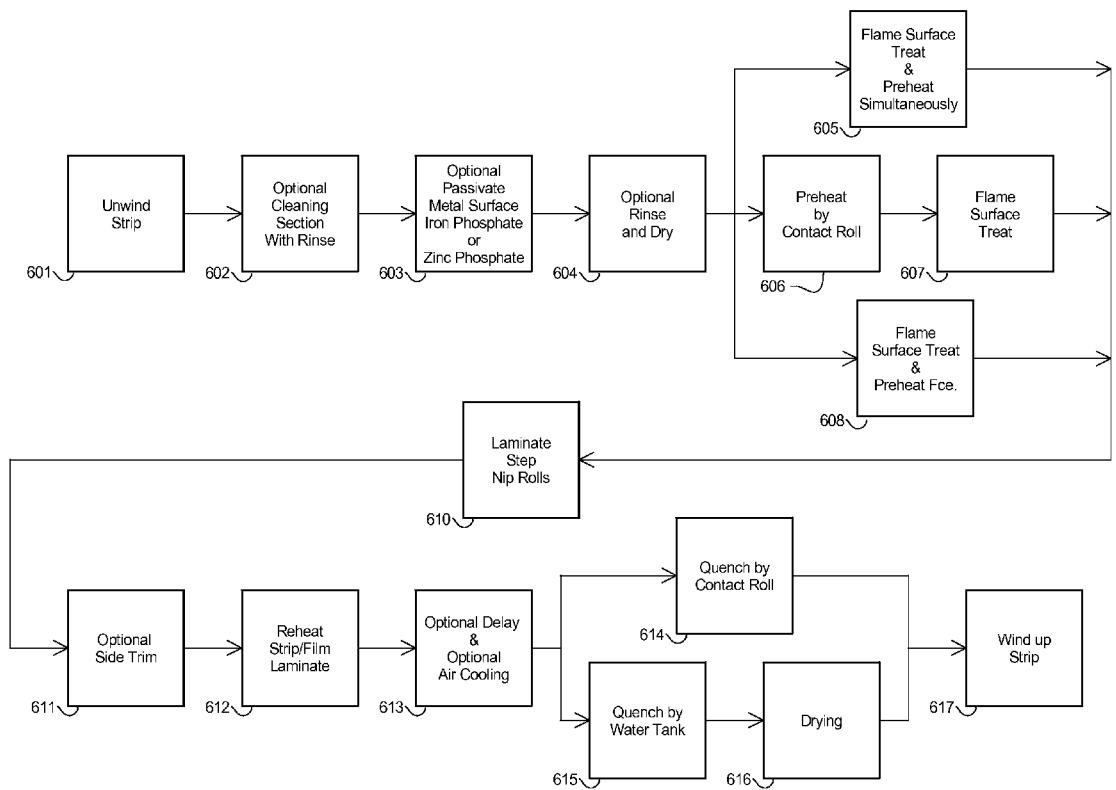
FIG. 6 is a block diagram of important processing steps of a batch production metal strip laminating line.

FIGS. 1, 4, and 6 further explain each of the above processing steps and includes variations and optional processing steps that are needed for a commercial operation.

FIG. 1 is a preferred general line layout arrangement. A metal coil 101 is mounted on a payoff reel which pays off a strip 102 to a series of dip tanks. The first tank 103 is a cleaning solution, preferably an alkaline solution. It then passes through to a water rinse tank 104, a passivation tank 105, and a final rinse tank 106. The passivation is preferably an iron phosphate or a zinc phosphate solution. The manufacturer's recommendations are followed as to tank temperature and residence time in the tank. The now cleaned and passivated strip surface is dried by direct flame impingement 107, or other means such as forced air or hot air drying.

The strip is then preheated by pair of heating contact rolls 108 that heat the strip up in preparation for thermal lamination. A flame surface pretreatment 109, preferably after the heating contact rolls 108, prepares the metal surface by increasing the surface energy so that the film will wet out and achieve a measured amount of adhesion at the film-metal nip point. The heating contact rolls 108 are preferably heated by a closed hot oil system or a controlled electrical heating system. It is desirable for the metal to be heated evenly across the width within 20° F. and preferably within 10° F. to prevent strip buckling or shape problems, and to ensure that the metal film contact point provides appropriate adhesion across the entire strip width. Laboratory measurements with thermal lamination have shown that the required metal laminating may be fairly large operating window, provided there is suitable wet out to eliminate air entrapment between the metal surface and film. The target temperature is polymer dependent.

The flame surface pretreatment 109 is a natural gas flame that directly impinges or is close to the metal strip surface. The natural gas to air ratio is carefully controlled by a premix system to be close to the perfect combustion ratio. In practice, the flame is normally slightly oxygen rich, approximately 0.5%, but the pretreatement may be adjusted slightly gas rich allowing the flame to extend and provide a more direct surface burn, depending upon the metal surface condition. Other burnable gases, such as propane or butane, could be used instead of natural gas.

The flame surface pretreatment 109 may also be used to provide the correct thermal temperature for the lamination. In a preferred embodiment, the firing rate is coordinated with the heating contact roll 108 temperature and line speed to provide the correct metal temperature at the metal film contact point. This feature provides important control of the metal temperature during the initial startup as a higher metal temperature can be used. The higher metal temp provides for proper adhesion when the laminate nip rolls 111 are cooler without having to elevate the temperature of the contact rolls which are subsequently hard to control. The large amount of thermal mass in the contact rolls provides very sluggish temperature control and is likely to overheat the metal causing sticking problems with the laminate nip rolls 111.

The pretreated and preheated metal strip then enters the laminating nip where a pair of laminating nip rolls 111 presses the upper film 110a and lower film 110b against the metal surface. An air cylinder, spring, hydraulic cylinder, or other force generating means provides an adjustable pressing force of up to 100 lbs/inch of roll width. The laminating temperature is measured by an infrared sensor 112a, after the film to metal contact point, which looks at the proper measuring wavelength of the laminate film. In a preferred embodiment, the laminating nip rolls 111 are a rubber covered steel roll. They may also be made from other materials such as chrome covered steel rolls or stainless steel rolls. It is important that the rolls do not cut, gouge, or deteriorate easily at the laminating pressure and temperature. The rolls may be water cooled, if needed, to prevent polymer sticking.

Film that overhangs the edges of the now coated metal strip is then side trimmed by one of two score cut knives 113a and 113b on a hardened back up roll 114, and the excess trim is removed by a vacuum waste system (not shown). The two knives are redundant and provide important trimming reliability. The position of the score cut knives 113a and 113b on the fixed, hardened backup roll 114 may be adjusted while the coated metal strip is moving in order to track the edge. This will be discussed further in FIG. 2. The hardened backup roll 114 is optionally water cooled.

The coated metal strip then passes through a reheat section where an induction furnace 115 reheats the metal film structure to a temperature suitable to develop the desired final adhesion. This temperature is polymer type dependent and is normally above the melting point of the polymer adjacent to the metal surface. If a two layer tie/bulk structure is used, the reheat temperature is usually above the melting point of the tie layer. Generally, it is also usually above the bulk layer melting temperature as well. Often the final desired adhesion is developed only when the entire polymer structure is raised to the molten state. The temperature is measured by a second infrared sensor 112b.

In a preferred embodiment the reheating furnace 115 is an induction furnace. An infrared heating furnace is likely to overheat the coating with subsequent damage. A heating furnace that uses a direct flame has similar problems. A convection furnace is long and causes a somewhat higher yield loss by lengthening the production line. Infrared, flame, and convection furnaces are embodiments of the present invention, but are not as preferred as an induction furnace.

The coated metal strip is then cooled by a pair of cooling contact rolls 116 that bring the coated metal strip temperature downward to the desired winding temperature. These rolls are preferably water cooled, but may be oil cooled depending upon the final temperature. The surface finish of the cooling contact rolls 116 provides important gloss and texture properties to the final film-metal laminate. An infrared sensor 112c looks at the proper wavelength of the coating to ensure that the polymer winds up with the correct temperature. The winding temperature may be varied, depending upon the coating. An elevated winding temperature allows a tie layer to continue to develop a chemical bond or it may enhance any crystalline effects in the coating. Winding temperatures vary from ambient to 200° F., and more typically are 60 to 130° F.

A pair of pinch rolls 117 are used to deflect the coated metal to the winding coil 118. An edge guiding system (not shown) may be added to the winding reel to ensure that the coil sidewall is straight. The pinch rolls 117 are closed by an air cylinder and at least one roll is motor driven. These rolls are used to help thread the line for each coil.

The temperature profile of the cooling contact rolls 116 is preferably within 20° F., and most preferably within 10° F. across the width. A temperature profile may occur due to the way the internal cooling fluid is routed inside the roll and the high heat transfer rate required. An even temperature profile prevents uneven metal thermal contraction and eliminates an uneven cooling problem. If the temperature profile of the roll is too large, the film-metal laminate will contract unevenly over the roll surface, lift off the roll briefly in some areas, and then snap back onto the roll surface. This problem causes an uneven film-metal laminate cooling and may contribute to crystallinity or quality defects.

The line tension and speed are controlled by the winding reel 118 and payoff reel 101 respectively. However, this may be reversed. A line speed or strip tension measurement may be added to any of the deflector rolls with a fixed passline.

The overall threaded strip length for a line configured per FIG. 1 is approximately 100 feet. This type of arrangement is aligned to the financial goal of operating with a low steel yield loss. Based on financial considerations, it is preferred to keep the threaded strip length less than 200 feet. The line length can vary depending upon other processing issues, such as the desire to add inspection areas, corona post treatment, an exit surface waxing station, or allow more time for the polymer to bond to the metal at the reheating temperature before it is cooled.

The line can be operated to coat either side or both sides of the metal substrate. The line operation is generally the same for a one side coating or a two side coating.

Only two operators are required to operate the line as shown in FIG. 1. Most of the work is material handling and the initial operational startup for each coil. Once operating, the line may be sufficiently automated so that only one person needs to monitor the operation part of the time. The operators are then free to do maintenance, warehousing, various inspections, setting up the next coil, etc. For safety reasons, it is preferable that no less than two operators work together and provide suitable assistance to each other. Economical operation is possible even at a very low operating speed of 20 fpm. The two operators are able to operate a second or even third line simultaneously, depending upon the line speeds employed.

As previously mentioned, it is important to avoid damage between the roll surfaces and the strip during the threading operation. Laboratory observations of surface scratching between the strip and rolls were primarily due to dragging the metal across the roll surface when the roll was not rotating with the strip. This is avoided if there is intimate contact between the rolls and the metal surface during threading. The threading process for a new coil is greatly simplified by utilizing the portion of the previous coil which is remaining in the line.

A preferred threading method is to thread the first coil by hand. The coil is then processed normally and the line is stopped at the point when the tail end will just come off of the payoff reel. The temperature pretreating, laminating, and post treating processing equipment is stopped as well. The strip is still threaded throughout the line length. The strip is then cut at the winding reel and the coated coil removed. The strip is also cut at the payoff reel and any remaining small entry coil remnant is discarded. A new coil is loaded on the payoff reel and spliced to the strip remaining in the processing line. The splice may be tape, tack welds, or other joining method. A preferred embodiment is to join the coils in a manner that will fail if the strip is heated. The exit pinch roll 117 is then operated to thread the strip onto the winding reel. Line tension is then established and the line is started normally, including cleaning, passivation, surface pretreating, and preheating. The laminating process begins when the strip splice just passes by the laminating nip rolls. The remaining portion of the previous coil, the splice, and off specification material are wound into the ID of the exit coil. This threading sequence generates a minimum amount of scrap and provides for threading the line without roll scratching damage.

A second preferred threading method follows. A coil is processed normally and the line is stopped at the point when the tail end will just come off of the payoff reel. The strip is still threaded throughout the line length. The strip is then cut at the winding reel and the coated coil removed. The strip is also cut at the payoff reel and any remaining small entry coil remnant is discarded. A new coil is loaded on the payoff reel and hand spliced to the strip remaining in the processing line. The splice may be tape, tack welds, or other joining method. The exit pinch roll 117 is then operated to pull the entry end of the new coil through the line. When the splice reaches the winding reel, the strip is cut again to remove the splice. The strip is now threaded onto the winding reel. The threading sequence is complete. This threading method has the advantage of bringing the splice through the entire line and ensuring a splice break will not cause additional scrap. For a very short line, this is a preferred operational method.

Even though these threading methods create a fixed amount of scrap for each coil, the overall economic benefit is better by threading faster and avoiding roll scratching damage.

Another important processing issue is the level of adhesion of the polymer to the metal substrate. It is well known in the art that maleic anhydride functionalized polymers provide a strong bonds between a polymer and a metal, such as aluminum foil. It is a distinct commercial advantage to provide for a laminating process that exploits this by incorporating a tie layer in the polymer film. A functionalized polyethylene is particularly useful because it will have a strong bond to the metal substrate and also adhere to a higher melting temperature polymer such as a polypropylene or a polyester such as polyethylene terephthalate (PET).

Typical commercial functionalized polymers available for use in a tie layer are: acid-modified ethylene acrylate, anhydride-modified ethylene acrylate, anhydride-modified ethylene vinyl acetate, acid/acrylate modified ethylene vinyl acetate, anhydride-modified ethylene vinyl acetate, anhydride-modified ethylene vinyl acetate, anhydride-modified polyethylene, and anhydride modified polypropylene. Each type may be chosen based on the film to be laminated to the metal substrate. It is preferable to include a maleic anhydride and an acrylate functionality in the tie layer when using a polyester film. For example, a laminating film may be two layers: a 20% thick functionalized polyethylene tie layer which incorporates maleic anhydride and an acrylate group and an 80% thick polyester such as PET.

It is not absolutely necessary for the surface of the metal substrate to be pretreated with a chemical treatment or passivation such as chromium oxide or phosphate system. A maleic anhydride functionalized tie layer will strongly adhere to a wide variety of metals directly, provided the surface is free of oils, free of debris, and has been pretreated to elevate the surface energy. Avoiding the passivation step commonly used in the paint industry is another economic and environmental advantage to laminating.

However, the need for cleaning and passivation is market dependent. The cleaning and passivation steps shown in FIG. 1 are a preferred embodiment for markets where passivation provides important properties to the metal substrate. For example, markets requiring salt spray corrosion testing per ASTM B 117 generally require passivation to achieve a minimum of 500 hours and often require corrosion inhibitors on the metal surface under the film.

One important way to ensure good adhesion and film wet out is to take a surface energy reading of the metal substrate before any pretreatment. Laboratory experience has shown that pretreatment will raise the surface energy level as much as 15-20 dynes. Based on limited laboratory results, a minimal surface energy for sufficient polymer wettability is 55 dynes. This provides a basis for a metal surface specification averaging at least 35 dynes for an incoming metal coil.

To ensure reliable adhesion, FIG. 1 shows the metal substrate entering the laminating nip point directly from the flame surface pretreatment without touching any deflector rolls. This avoids any possibility of roll surface debris affecting the metal surface energy. It also provides for immediate, reliable quality when starting the laminating process on each coil.

A wide variety of commercial metals broadly classified as aluminum, aluminum alloys, steel, low carbon steel, high carbon steel, stainless steel, steel alloys, tinplate, tin free steel, nickel, copper, titanium, and brass may be successfully laminated. Various metallic coatings such as aluminum, zinc, chrome, nickel, tin, and combinations thereof may be on the surfaces of the metal substrates. Steel and aluminum are the most commonly coated metals in coil form. It is preferable that the surface of the metal is suitably smooth. Dross on the surface from a hot dipped zinc coating line, for example, will allow some air to be trapped between the metal and the film.

The laminating temperature sensor is preferably located just after the lamination point. Laboratory experiments have shown that infrared sensing of film temperature on metal is highly accurate for commercial sensors provided the correct polymer wavelength is used. Measuring the temperature of the metal surface prior to laminating is unreliable.

Figure 2A:
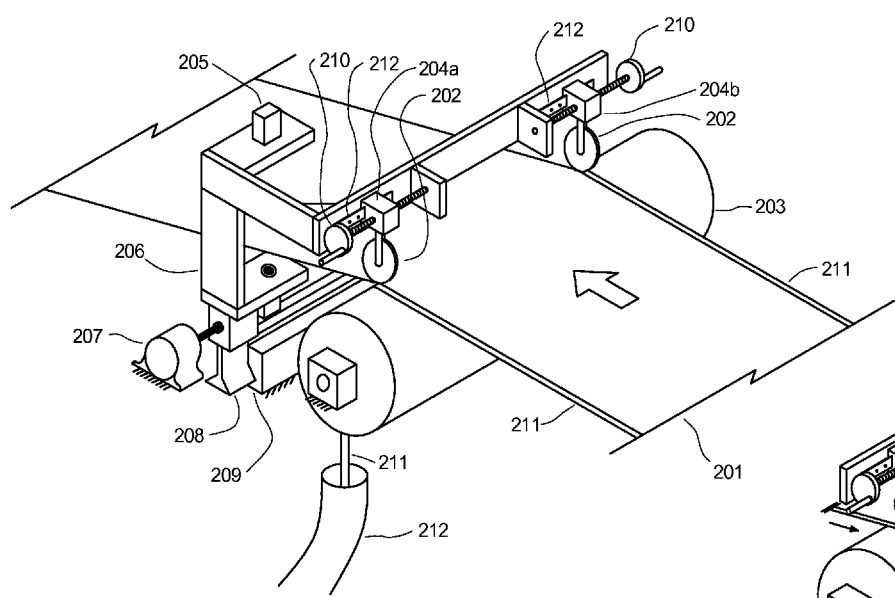
FIGS. 2A and 2B are an arrangement of a film edge trimming unit on a metal edge including a backup trimming knife on a common moving frame.

As mentioned before, a method of dynamically matching the film width to the metal substrate must be created. FIG. 2A shows a general arrangement of a preferred method of trimming excess film width from the metal edges. A coated metal strip 201 with overhanging film width 211 passes over a hardened backup roll 203 where the overhanging film width 211 is trimmed by rotating score cut knives 202. The rotating score cut knives 202 are pressed against the backup roll 203 by air cylinders 204a and 204b. The left air cylinder 204a and the right air cylinder 204b are positioned on their respective sliding rail 212 by a hand wheel 210.

An analog photoelectric sensor 205 is used to locate the edge of the metal and is designed to disregard any overhanging film that may be present. Two or more on/off style photoelectric detectors could also be used. The use of two photoelectric sensors allows an on-off control with a dead band zone where there is no change in knife position. As embodied in this invention, the edge sensor(s) may be an analog or an on/off style. It is preferable to use a light source with an output that can be varied. It is also preferable to use photoelectric sensors that eliminate cross talk when the sensors are close together.

Laboratory experiments revealed that infrared sensors at 880 nm wavelength provided the greatest ability to find the metal edge even with overhanging film present. The diffusing properties of the film, the varying film thicknesses, and different colors present a significant challenge for reliable edge detecting. Photoelectric sensors have a tendency to change their trip point when the thickness or color changes. It is preferable, therefore, to be able to change the position of both knives relative to the photoelectric sensors.

A knife positioning frame 206 is moved by a motor 207 which responds to the metal edge position. The knife positioning frame 206 slides on rail 208 within sliding way 209. Sliding way 209 is substantially parallel to the backup roll 203.

After the overhanging film width 211 is trimmed, it is removed by vacuum removal tube 212. For improved trim removal reliability, it is preferable to pull the trim off the hardened backup roll 203 at a 90° angle to the metal substrate 201 as shown.

The tracking speed of the score cut knives must be very slow compared to the line speed. Fast knife motion will only cause the knife to scrape across the backup roll. It has been observed in the laboratory that a knife speed of less than 1% of the strip speed will provide adequate tracking response and not damage the knives. A knife speed at 0.25% of the strip speed will normally provide adequate tracking response. When the knives move, they are walking over to their new position rather than scraping on the backup roll. The angle of attack of the rotating knife blade relative to the metal edge remains parallel for practical purposes. In the laboratory, no problems with rotational bearing damage or reduced life were observed.

As an alternate to FIG. 2A, the backup roll may be attached to the knife positioning frame as well. This allows the score cut knives to remain on the same spot of the backup roll. This has some advantages of simplifying the mechanical equipment and reducing the width.

Laboratory experience has shown that this method of trimming is reliable. Brief control excursions where the metal edge contacts the score cut knife do not immediately damage the knife. However, repeated or long excursions tend to nick the hardened knife and cause a small spot on the film to remain attached. The knives may be sharpened somewhat during cutting with a stone or other sharpening instrument if suitable safety precautions are taken, and if the sharpening does not drop material on the laminate film. Due to bearing tolerances, the knives even tend to lean against the metal edge with a control excursion, and are slightly reluctant to lift up on top of the metal strip which helps to improve reliability. However, it is vital that the edge sensors properly detect the edge position and knife to metal contact is avoided.

Figure 2B:
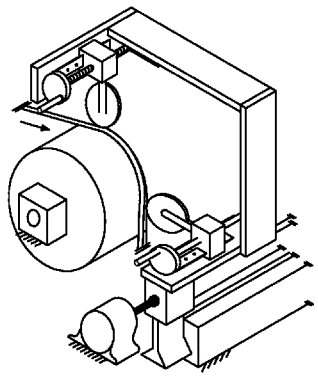

FIG. 2A shows only one pair of score cut knives. In another preferred embodiment, FIG. 2B shows a how a redundant pair of score knives may be used to trim at an edge of the strip.

In a preferred embodiment, side trimming knives may be employed on the film before the laminating step to trim the film width dynamically to the strip width. This method is preferred in the cases where the polymer film becomes sticky and is difficult to trim away reliably from the hot metal. Some polymers have been known to create 'stringers' where the score cut knife is unable to satisfactory cut through the softened polymer film. Also, in some cases, the polymer film has a tendency to adhere to the knife. By trimming the film directly, just before laminating, the film width can be adjusted to the correct width by ensuring the metal is completely covered when observed at the winding reel. This takes into account any shrinking in the post treating step. Similar to FIG. 2, the film cutting knives may be put on a guiding rail and track the strip edge position. This also has the advantage of allowing the strip edge to be detected prior to the laminating point with enhanced reliability and provide for matching the film position dynamically to the strip position.

Figure 3A:
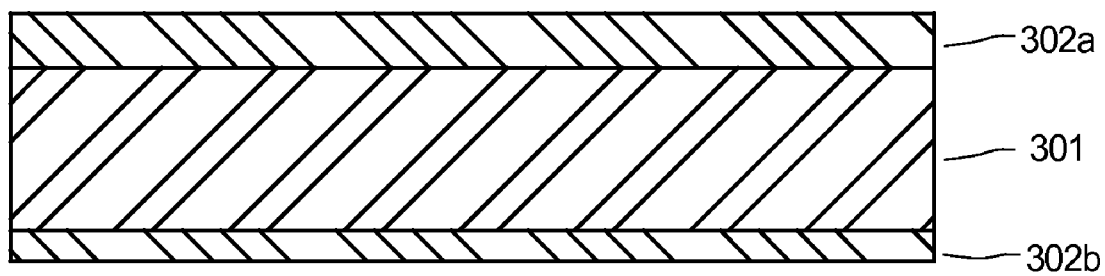
FIGS. 3A and 3B show a film structure of one or two layers.
Figure 3B:
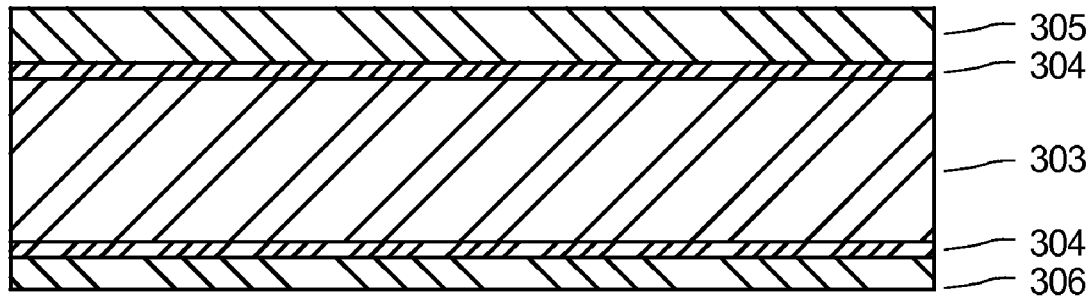

FIG. 3A shows a monolayer polymer film structure 302a on a flat metal substrate 301 on the upper side and the same monolayer polymer film structure 302b on the other side but with a different thickness. FIG. 3B shows a film structure with two layers in it. On the top of the flat metal substrate 303 there is a two layer film with a tie layer 304 and an outer layer 305. On the bottom of the flat metal substrate 303 there is a two layer film with the same tie layer 304 and a different outer layer 306. The overall film thickness on each side of the flat metal substrate 303 may be the same or different.

The operator may ensure there is enough material to cover the coil by weighing the film roll or by measuring the outside diameter. If a partial film roll is to be added to another roll, the film to film splice location may be marked with a small protruding paper flag. When laminating a film roll with a flag in it, the operator may watch this flag position while running and then mark the laminated coil at the place where the two films are spliced together. This informs customers of where the film splice is located, allowing them to modify their operation to avoid using material with a film splice.

Methods are known that allow two rolls of film to be joined while they are feeding into a processing line, without stopping or slowing the line. This is commercially feasible at speeds over 1,000 fpm. This requires additional equipment and capital expense, but this method may be utilized if the batch laminating line targets higher production levels at higher speeds.

FIG. 4 is another preferred line layout. This line layout does not include a surface passivation or a cleaning section. A payoff reel 401 unwinds an entry coil 402 so that a metal strip 403 may be coated. A pair of deflector rolls 404 direct the metal strip 403 to a surface flame treatment 405, which has been previously described. In this line, the surface flame treatment is not designed to provide an elevated metal temperature. An induction furnace 406 preheats the metal to the required laminating temperature to achieve an initial bonding. Two rolls of film 407a and 407b are laminated, respectively, on the top and bottom side of the metal strip. A pair of laminating rolls 408 press the films against the metal strip by use of an air cylinder 409 on the top roll. An infrared sensor 410 measures the laminating temperature by looking at the correct wavelength of the film.

Slitting knives 411a and 411b are used to trim the lower film 407a and upper film 407b respectively to the correct width based matching the metal edge positions using a metal edge sensor 425 on each edge. The slitting knives match the film width dynamically to the metal substrate width and account for multiple effects previously mentioned. In a preferred embodiment, a pair of upper knives on each film edge and a pair of lower knives on each film edge are all mounted on a common frame so that the guiding control is simplified, increasing the reliability. Since the knives follow the position of the metal strip, in a preferred embodiment the film rolls and metal strip do not have to be guided dynamically into the laminating nip. The preferred embodiment may be followed providing the film widths are greater than the metal strip width with sufficient tolerance to ensure complete coverage.

The type of slitting knives that will be effective and reliable is well known in the art. Various configurations of slitting knives may be used, with manual and automatic adjustments. For example, the slitting knives on the upper film may be manually set to a fixed width and both knives are positioned by a dynamically moving common frame. Equally, each slitting knife may track the metal edge separately. Other configurations are possible including moving all of the lower and upper slitting knives together on a common frame.

The strip is directed to a second induction furnace 413 by deflector rolls 412 which may be water cooled to prevent the hot metal-laminate coating from sticking to the roll surface. At the induction furnace 413, the metal is reheated to a final temperature that will facilitate high bonding strength between the polymer and metal surface, and will further provide important coating characteristics. A second infrared sensor 414 monitors the reheat temperature. The strip is then directed toward a water quenching tank 415 with a submerged roll 424, and the strip exits the tank through wringer rolls 416 and air blow offs 417.

The strip is then ready for winding. The strip passes through a pair of pinch rolls 418 where an air cylinder 419 provides the pinching force. One or both of the pinch rolls 418 has a motor for purposes of threading the strip. The strip is then directed to a winding reel 420 where it is wound into an exit coil 421.

Standard lifting equipment such as a cart 422 and overhead crane 423 are used to move the film rolls into position.

Overall, the line is designed in the compact manner, as shown in FIG. 4, so that the treated length of strip is preferably less than 200 feet. In the case of FIG. 4, the threaded strip length is approximately 55 feet. The operating method for the batch line, as embodied in this invention, would generally mean each coil would have a yield loss approximately equal to the threaded strip length. For tinplate coatings, where the coil length is commonly 20,000 to 25,000 feet long, the yield loss is commercially acceptable for a batch coating operation. For a sheet coil, where the strip length is commonly 5,000 to 10,000 feet long, this yield loss is also commercially acceptable.

As an alternate, a second "scrap" winding reel (not shown) could be added so that the off specification material is wound up onto a different reel for easy recycling. This method has the advantage of removing unwanted material from the ID of a coil so that the customer receives only prime material. The non-prime strip could also be fed into choppers, cutters, and scrap boxes that are known in the art. Additional handling equipment would be needed to cut the strip and thread it onto the winding reels.

In general, a preferred method of controlling the laminating temperature is to utilize an induction furnace. The induction furnace power is controlled to be proportional to the metal mass throughput. This will keep the metal temperature very closely controlled for line speed changes and allow for very rapid development of the correct initial laminating temperature. The flame pretreatment also provides some nominal metal heating and may be controlled to vary with the line speed or kept at a constant amount. For the initial laminating control, the line can be operated at reduced speed until the control stabilizes. This will improve yield.

Figure 5:
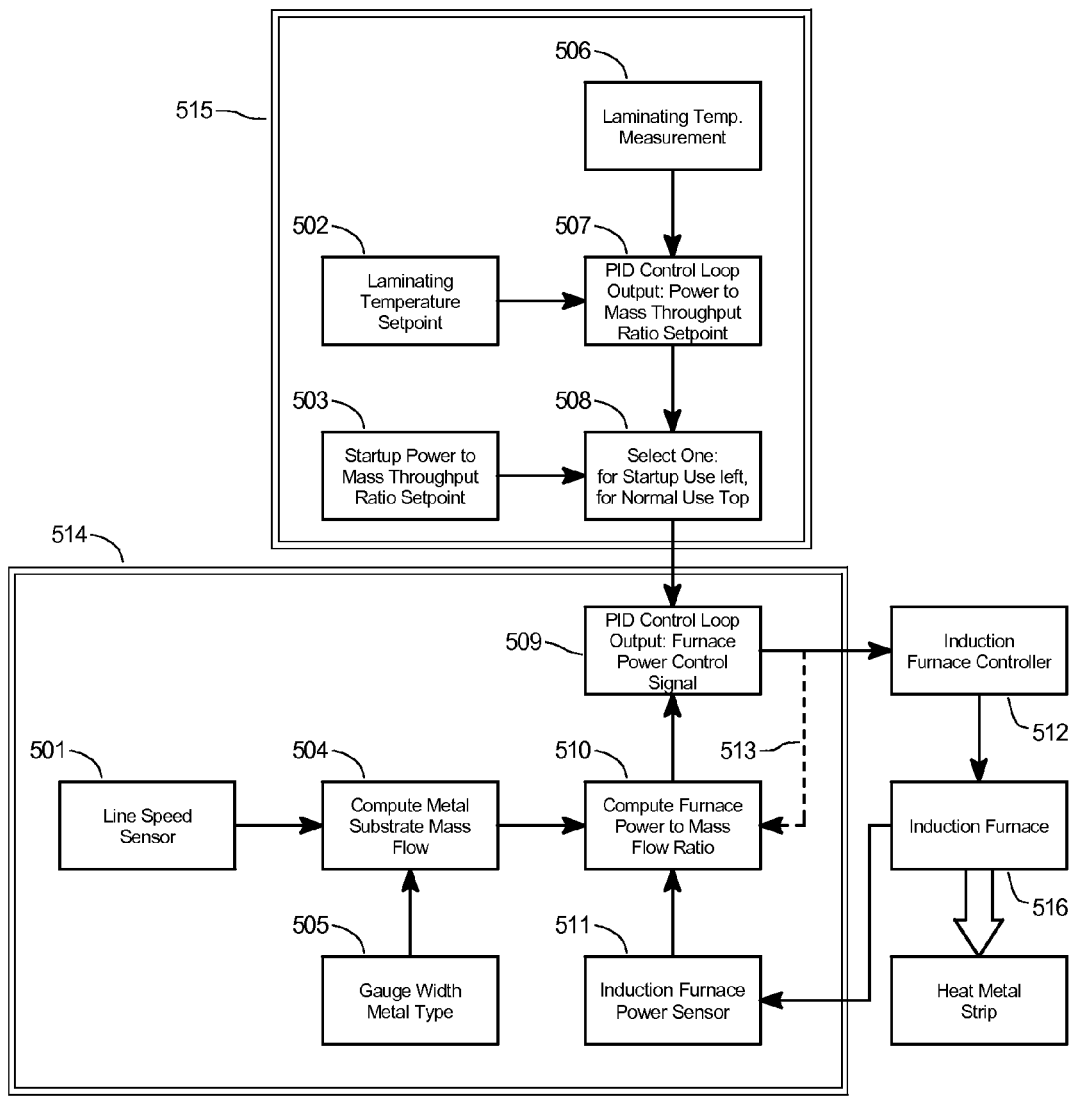
FIG. 5 is a block diagram of the induction furnace control.

FIG. 5 is a block diagram for an induction furnace control. The control can be generally described as an inner control loop which maintains a constant furnace power to metal mass throughput ratio. An outer loop trims or varies the ratio based on the measured laminating temperature. This control is adapted for a faster control response and more stable control. Infrared temperature sensors can be sluggish and require averaging functions which hinders accurate temperature control based only on a temperature feedback. Also, slower line speeds will have a transport lag as the metal strip must physically move from the induction furnace to where the temperature sensor obtains a reading.

In FIG. 5, the inner control loop 514 is comprised of a line speed measurement 501 and the metal substrate gauge and width 505 which are used to compute the metal substrate mass flow throughput 504. The mass flow throughput 504 along with the induction furnace power sensor 511 is used to compute the furnace power to mass flow ratio 510. This is a feedback variable to a PID control loop 509 where the furnace power to mass flow ratio 510 is controlled. The output control signal from the PID control loop 509 is sent to the induction furnace controller 512 which in turn controls the induction furnace 516 power. The setpoint for this inner control loop 514 comes from an outer control loop 515 where the laminating temperature measurement 506 is compared to the laminating temperature setpoint 502. The output from a PID control loop 507 then becomes a setpoint for the PID controller 509 in the inner control loop 514 during normal operation. During startup, a temporary power to mass throughput ratio setpoint 503 is used. Box 508 means that either the output from box 503 or from box 507 is passed directly to box 509. Box 508 may be thought of as an operator selector switch.

As an alternate, the output 513 of the inner PID control loop 509 can be used to compute the furnace power to mass flow ratio 510 rather than the furnace power sensor 511.

Overall, this control system provides for better control by quickly matching the furnace power to any line speed changes, and will maintain proper temperature without an immediate temperature feedback measurement. It also provides for reaching the initial laminating temperature more quickly because the setpoint for the inner control loop can be temporarily adapted to the previous coil or previous experience until the operator sees is a valid steady state laminating temperature measurement.

FIG. 6 is a block diagram of preferred processing steps for a commercially viable batch production metal strip laminating line. A metal strip substrate is unwound 601 from a payoff reel where it is routed into a cleaning section followed by a rinse 602. Preferably, the cleaning solution is an alkaline cleaner, but various soaps, and other additives can be included which are known in the art. The cleaning section may also include electrical grids to assist in removing oil and debris from the metal surface.

The metal strip is then passivated 603, preferably with an iron phosphate or zinc phosphate. Alternately, a chromium based solution could be used, such as chromium oxide. The passivation solution to be used depends upon the market to be served. The strip is then rinsed and dried 604.

It is to be understood that processing steps 601, 602, and 603 are optional. They are not a requirement for a laminating line, but may be necessary for some coating markets.

The metal strip is then pretreated by one of several preferred options. A surface flame treatment 605 may be used to actually preheat the metal strip to the required laminating temperature in addition to improving the surface energy. This is a simple and low cost method to accomplish an important function. For some metal substrates and laminating films, this is sufficient to establish adhesion, suitable cleanliness, and wet out properties.

The metal strip may also be pretreated by preheating with a heating contact roll 606. The metal strip would then be surface treated 607 to improve surface energy prior to laminating. This sequence is preferred, in this case, as the heating contact roll is likely to allow dirt or oils to be placed on the metal surface. Also, the surface flame pretreatment control and size may be designed to provide a measure of strip temperature control.

The metal strip may also be pretreated by a flame surface treatment and preheat furnace 608. Preferably, the heating furnace is an induction furnace. Alternately, it could also be an infrared heating furnace. However, the infrared furnace is troublesome due to the high temperatures needed and requires a greater line length. Similarly, a gas fired heating furnace may also be used but is not as preferred. The flame surface treatment preferably precedes the heating furnace. The flame surface treatment may be after the heating furnace, but is not as preferred.

The strip, now suitably prepared for laminating, is then routed to a pair of laminating rolls 610 where a film is pressed onto one or both sides of the strip. Features related to this step have already been previously discussed.

Any overhanging film going past the metal edges is then trimmed 611. It is preferred to trim the film promptly away from the metal immediately after the laminating step. This step is not required if the film width matches the metal width, or if the film is edge trimmed before the laminating step.

The strip is then routed to a reheat section 612 where the metal strip-laminate is reheated to the a temperature needed to create the final adhesive bond and coating properties. The reheat furnace is preferably an induction furnace. However, an infrared or gas fired oven may also be used. An induction furnace is preferred as it will heat the coating from the inside out rather than force heat through the coating. Lamination experiments have shown that the metal strip and coating are in very intimate contact, and the metal temperature and coating temperature are very closely equal. An infrared furnace, for example, has the disadvantage in that the energy needed to warm up the metal strip must "go through" the coating and is likely to require a large differential temperature between the coating and metal. Consequently, the coating is likely to scorch or blister at production speeds that are needed for a commercial operation. Flame fired furnaces have similar problems and are not as preferred.

An optional delay 613 may be needed, for some coatings, to develop necessary adhesion throughout the metal-laminate structure. Also, some coatings are highly crystalline, and the required balance between surface hardness and forming flexibility are established by the cool down timing and rate. For crystalline coatings, a preliminary forced air cooling is helpful to bring the coating down to an intermediate temperature before the final cooling for winding.

The strip must be brought back to a suitable winding temperature by use of cooling contact rolls 614, or by a water quench 615 with suitable air or forced air drying 616. In a preferred embodiment, the forced air drying 616 is heated. Additional equipment such as wringer rolls or wipers may also be employed to provide a dry metal-polymer laminate for winding 617. The winding temperature may be chosen based on crystallinity requirements.

While various embodiments of the present invention have been described, the invention may be modified and adapted to various uses to those skilled in the art. Therefore, this invention is not limited to the description and figures shown herein, and includes all such changes and modifications that are encompassed by the scope of the claims.

We claim:

1. An improved commercial batch laminating process for a flat metal substrate comprising:
   a. continuously unwinding a coil of said flat metal substrate by controlling the tension and speed of said flat metal substrate,
   b. pretreating one or both major surfaces of said flat metal substrate by raising the surface energy of any said major surface to at least 55 dynes,
   c. preheating said flat metal substrate to a laminating temperature,
   d. pressing a laminating film onto any said pretreated major surface of said flat metal substrate thereby creating a film-metal laminate, wherein each said pretreated major surface of said flat metal substrate may have a different said laminating film,
   e. wherein any of said laminating film comprises primarily a thermoplastic polymer,
   f. reheating said film-metal laminate to a post treatment temperature,
   g. cooling said film-metal laminate to a winding temperature,
   h. wherein the threaded length of said flat metal substrate in said commercial batch laminating process is less than 200 feet, and
   i. wherein said commercial batch laminating process includes the capability to dynamically trim any laminating film which is wider than said flat metal substrate to substantially the same width as said flat metal substrate.

2. A process according to claim 1 wherein said dynamic trimming comprises a plurality of rotating knives that are positioned relative to the lengthwise edges of said flat metal substrate by an electronic control, wherein the motion of said rotating knives that is perpendicular to the lengthwise direction of said flat metal substrate is less than 1% of the lengthwise speed of said flat metal substrate.

3. A process according to claim 2 wherein two said rotating knives are positioned relative to each lengthwise edge of said flat metal substrate.

4. A process according to claim 2 wherein said electronic control incorporates sensors that measure the position of the edges of said flat metal substrate utilizing infrared light.

5. A process according to claim 1 wherein said preheating of said flat metal substrate is performed by an induction furnace, and the heating power of said induction furnace is controlled by maintaining a relationship to the mass throughput of said flat metal substrate, and said heating power of said induction furnace is additionally controlled by feedback of said laminating temperature, and said laminating temperature is measured on said film-metal laminate by an infrared temperature sensor.

6. A process according to claim 1 wherein said reheating of said film-metal laminate to a post treatment temperature additionally maintains an even surface temperature of said film-metal laminate within 20° F. across the width of said film-metal laminate.

7. A process according to claim 1 wherein any said pretreated major surface of said flat metal substrate is untouched after said pretreating until any said laminating film is pressed against any said pretreated major surface of said flat metal substrate.

8. A process according to claim 1 wherein said flat metal substrate is passivated with iron phosphate, zinc phosphate, or chromium oxide prior to said pretreating of any said major surface of said flat metal substrate, wherein said film-metal laminate is capable of passing a salt spray test per ASTM B 117 with at least 500 hours of testing.

9. A process according to claim 1 wherein said winding temperature is above ambient temperature for the purpose of controlling the crystallinity of said film-metal laminate or for the purpose of improving adhesion in said film-metal laminate, wherein said winding temperature is chosen according to a predetermined criterion.

10. A process according to claim 1 wherein said reheating of said film-metal laminate to said post treatment temperature is performed by an induction furnace, and said induction furnace maintains said film-metal laminate temperature within 20° F. across the width of said film-metal laminate.

11. A process according to claim 1 wherein any temperature controlling roll that is utilized for the purpose of heating or cooling said flat metal substrate or said film-metal laminate maintains a uniform temperature within 20° F. on the surface of said temperature controlling roll.

12. A process according to claim 1 wherein at least one contact cooling roll is used to cool said film-metal laminate to said winding temperature, and said contact cooling roll has a surface finish designed to provide a pre-selected surface gloss to said film-metal laminate surface.

13. A process according to claim 1 wherein a surface flame treatment is utilized to raise the surface energy of any said major surface.

14. A process according to claim 13 wherein said surface flame treatment is also utilized to control said laminating temperature of said flat metal substrate.

15. A process according to claim 1 wherein any of said laminating film is a multi-layered structure with at least two layers.

16. A process according to claim 15 wherein said at least two layers comprises a tie layer and a bulk layer, wherein said tie layer comprises a polyethylene with a maleic anhydride functional group and, an acrylate functional group, said tie layer is next to said flat metal substrate, and said bulk layer comprises a polyester.

* * * * *

UNITED STATES PATENT AND TRADEMARK OFFICE
CERTIFICATE OF CORRECTION

PATENT NO. : 7,678,213 B1  
APPLICATION NO. : 11/530723  
DATED : March 16, 2010  
INVENTOR(S) : Mark V. Loen and James E. Velliky Page 1 of 1

It is certified that error appears in the above-identified patent and that said Letters Patent is hereby corrected as shown below:

IN THE SPECIFICATION:

Col 10, line 53: after "dynes" insert --/cm--;

Col 10, line 55: after "dynes" insert --/cm--;

Col 10, line 56: after "dynes" insert --/cm--;

IN THE CLAIMS:

Claim 1(b), col 16, line 34: after "dynes" insert --/cm--.

Signed and Sealed this  
Twenty-third Day of July, 2013

Teresa Stanek Rea  
*Acting Director of the United States Patent and Trademark Office*